United States Patent [19]

Hixon

[11] 4,167,126
[45] Sep. 11, 1979

[54] CONTROL SYSTEM FOR VEHICLE OVERDRIVE TRANSMISSION

[76] Inventor: William K. Hixon, One Scott Ct., Scotts Valley, Calif. 95066

[21] Appl. No.: 824,477

[22] Filed: Aug. 15, 1977

[51] Int. Cl.² ........................... F16H 5/42; F16H 5/46
[52] U.S. Cl. .................................. 74/336 R; 74/336.5
[58] Field of Search .................. 74/336, 336.5, 752 D, 74/473 R, 473 SW, 781

[56] References Cited

U.S. PATENT DOCUMENTS

| 2,662,418 | 12/1953 | Flinn | 74/752 D X |
| 2,947,192 | 8/1960 | Prather | 74/336 X |
| 3,125,893 | 3/1964 | Bensinger | 74/336 X |
| 3,386,316 | 6/1968 | Armantrout | 74/336 X |

Primary Examiner—C. J. Husar
Assistant Examiner—Frank H. McKenzie, Jr.
Attorney, Agent, or Firm—Townsend and Townsend

[57] ABSTRACT

A control system for use in controlling the operation of an overdrive transmission of a vehicle. The system includes a circuit containing a relay coil and a limit switch in series relationship with the governor switch of the transmission. The relay has two sets of double acting contacts, one set being provided to control current flow to the coil of a solenoid used to actuate the overdrive and the other set providing a grounding effect for the distributor side of the ignition coil of the vehicle. The limit switch is mounted so that it is actuated and deactuated by merely moving the gear shift lever of the vehicle. To this end, the gear shift lever has a bracket which engages a switch arm of the limit switch to move the switch arm as a function of the movement of the gear shift lever.

6 Claims, 5 Drawing Figures

U.S. Patent
Sep. 11, 1979
4,167,126
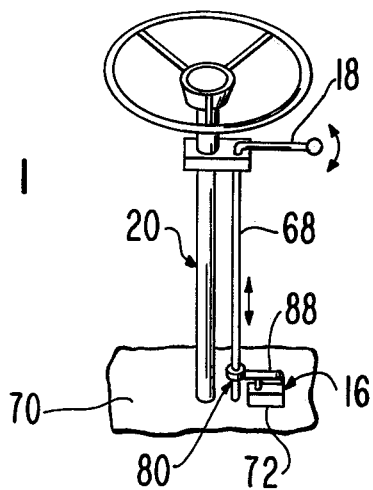
FIG. 1
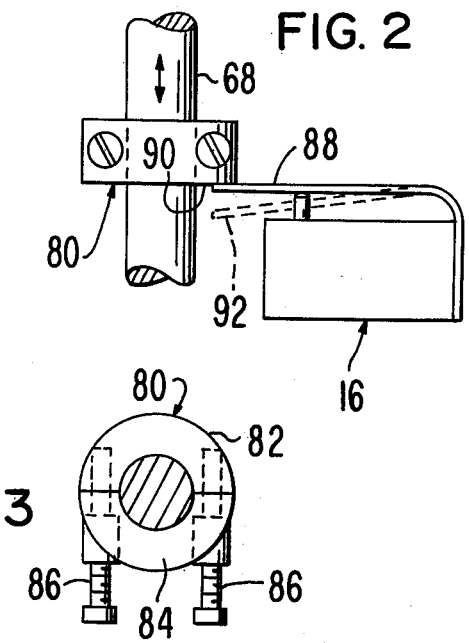
FIG. 2
FIG. 3
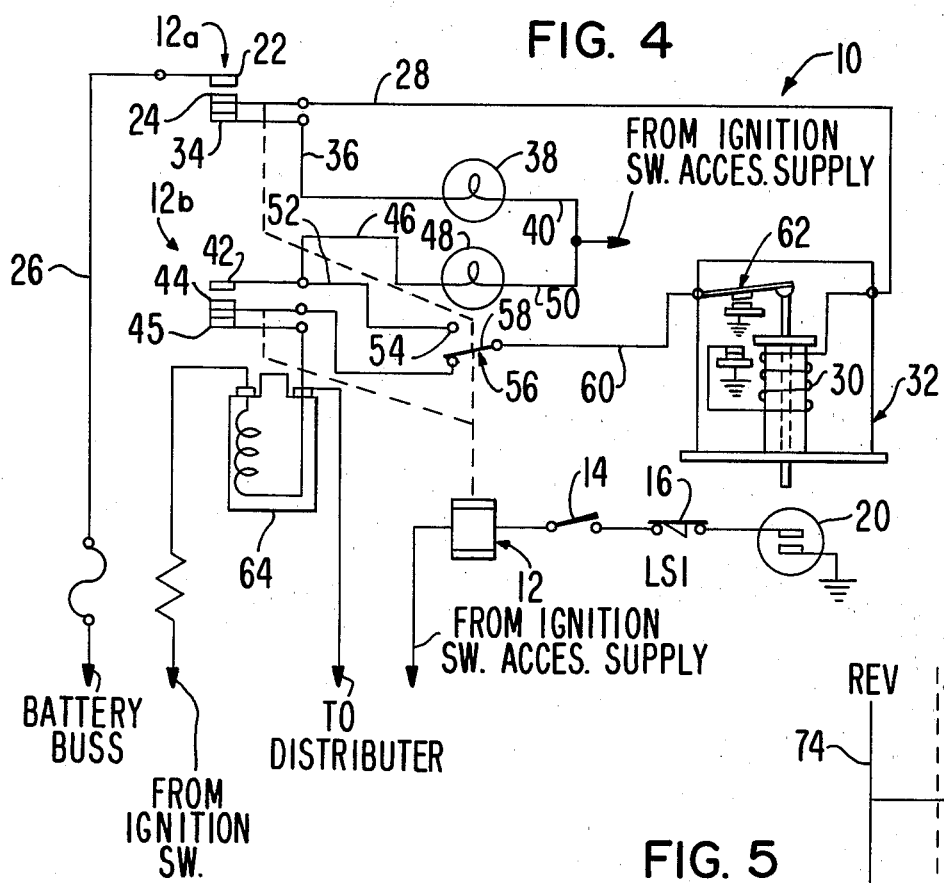
FIG. 4
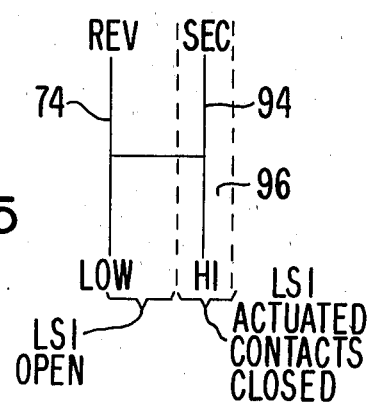
FIG. 5

CONTROL SYSTEM FOR VEHICLE OVERDRIVE TRANSMISSION

This invention relates to improvements in the control of vehicle transmissions, and, more particularly, to an improved control means for operating an overdrive transmission of the vehicle.

BACKGROUND OF THE INVENTION

Because of present day fuel shortages and demands, the need for fuel conservation and economy with respect to the operation of motor driven vehicles is of prime importance. One way to satisfy this need is to develop smaller engines to do the work of larger engines which have previously been used. To be efficient, an internal combustion engine, gasoline or diesel, must be operated within a certain range of speeds (rpm settings). To accomplish this, more and more closely spaced gear changes must be provided while giving ease of operation so that such changes will be accepted by the driving public.

Overdrive transmission mechanisms have been used in the past to provide fuel and other economies. However, the principal fault with such a mechanism has been in the control of it inasmuch as a vehicle driver, to operate such a mechanism, had to operate the vehicle at a full power condition, let the vehicle slow to a relatively slow speed, or switch the vehicle ignition system on and off to get the transmission out of the overdrive. Because of these disadvantages of operation, only minimal control of the overdrive was possible and this fact contributed to the decline in acceptance by the driving public of conventional transmission systems.

SUMMARY OF THE INVENTION

The present invention is directed to an improved control system capable of being applied to a common automotive transmission containing an overdrive. Such a transmission uses a speed sensing governor having a governor switch and a solenoid to engage the overdrive when a predetermined speed is reached. The control system of the present invention utilizes a circuit containing a limit switch in series with the governor switch and in series with the coil of a relay having a pair of contact sets, one of the sets being used to control the current flow to the solenoid and the other set being used to control the grounding of the distributor side of the ignition coil. The limit switch is mounted so that it is actuated and deactuated by a slight tapping of the gear shift lever so as to avoid the above-mentioned steps required in the operation of conventional control systems for overdrive transmissions.

The primary object of this invention is, therefore, to provide an improved control system for controlling the overdrive transmission of a vehicle so that immediate manual control can be achieved rather than having to accelerate the vehicle to the full power condition or having to let the vehicle slow to a relatively slow speed to take the transmission of the vehicle out of overdrive.

Another object of this invention is to provide a control system of the type described wherein the system is controlled by the actuation and deactuation of a switch operated by the manual manipulation of the gear shift lever of the vehicle so that the control system can be immediately operated to control the operation of the overdrive without the necessity for a speed change.

Other objects of this invention will become apparent as the following specification progresses, reference being had to the accompanying drawing for an illustration of the control system.

IN THE DRAWINGS

FIG. 1 is an elevational view of a steering wheel and steering column of a vehicle, showing the way in which one of the switches of the control system of this invention is mounted for actuation by manual movement of the gear shift lever and rod adjacent to the column;

FIG. 2 is an enlarged, fragmentary view of the gear shift rod and the switch of FIG. 1 with the rod having a bracket for engaging the actuating arm of the switch;

FIG. 3 is a side view of the bracket of FIG. 2;

FIG. 4 is a schematic view of the control system of the present invention; and

FIG. 5 is a schematic view of the gear shifting pattern showing the zones of the pattern in which the gear shift lever is located when the switch of FIGS. 1 and 2 is actuated and deactuated.

The control system of the present invention is broadly denoted by the numeral 10 and includes a control relay 12 in a circuit containing the coil of the relay, a manually actuated switch 14, a limit switch 16 actuated by the movement of the gear shift lever 18 adjacent to the steering column 20 of the vehicle, and a transmission governor switch 20 having one side coupled to ground. One side of the relay coil is connected to the ignition switch accessory supply of the vehicle, the opposite end of the coil being coupled to switch 14.

Relay 12 has two double acting switch contact sets 12a and 12b. Set 12a has a normally open pair of contacts 22 and 24, contacting 22 being coupled to a battery by a lead 26 and contact 24 being coupled by a lead 28 to one side of the coil 30 of a solenoid 32 adapted to operate the overdrive mechanism with which control 10 is to be used. Contact set 12a also includes a contact 34 normally engaging contact 24 and coupled by a lead 36 to one side of an indicator lamp 38 whose opposite side is coupled by a lead 40 to the ignition switch accessory voltage supply of the vehicle.

Contacts 22 and 24 of contact set 12a supply current to coil 30 of solenoid 32 from the battery connected to lead 26. Contacts 24 and 34 complete the ground path for lamp 38 when the coil of relay 12 is deenergized. Since the current to operate the lamp is so much less than that required to energize the coil 30 of solenoid 32, the lamp current will have substantially no effect on the load comprised of coil 30.

Contact set 12b has a normally open pair of contacts 42 and 44, contact 42 being normally in engagement with a third contact 45 and coupled by a lead 46 to a second lamp 48, the latter being coupled by a lead 50 to the ignition switch accessory voltge supply. Contact 42 also is connected by a lead 52 to one contact point 54 of a manually activated, single pole, double throw switch 56 having a switch arm 58 coupled by a lead 60 to a grounding switch 62 associated with solenoid 32. Switch 62 closes when coil 30 is energized to ground switch arm 58.

When the switch arm 58 is in the position shown in FIG. 4, contact 44 of said 12b is coupled to switch 62 in solenoid 32. This circuit provides a path to short out the distributor side of the ignition coil 64 of the vehicle if the coil of relay 12 is deenergized and the overdrive solenoid 32 is engaged through the normally closed contact 45 of contact set 12b. Switch 56 is provided as a means to disable the grounding of the distributor when the coil of relay 12 is operated as in the case of the gear shift lever being inadvertently shifted by a passenger of the vehicle of drop the vehicle out of overdrive. Also, it can be used as a trouble shooting aid to provide that the transmission control is not grounding out the ignition in the case of the ignition failure. Switch 56, by switching between contacts 42 and 44, enables lamp 48 to remain in operation while being grounded through the ground contact switch 62 of solenoid 32. If this circuit were used with a diesel engine, contact set 12b and switch 56 would not be needed. In such a case, lamp 48 would be grounded directly to the ground through switch 62 of solenoid 32.

Switch 14 is provided to disable the coil of relay 12 if difficulty is encountered in the solenoid. Since the solenoid is a high current device, full current is needed to pull it in far enough to open the pull in contacts within the solenoid. The high current demand of the solenoid would affect battery or charging failure, so that manually opening switch 14 would relieve the high current demand of the solenoid and permit continued operation of the vehicle until the battery or charging failure is eliminated. This would also prevent continuous high current flow through the solenoid coil and prevent damage to it.

Limit switch 16 is mounted near the gear shift lever rod 68, typically below the floorboard 70 by a suitable bracket 72. The switch is mounted in such a manner that it is deactuated when the gear shift lever 18 is moved toward the reverse-low side 74 (FIG. 5) of the H-shifting pattern of the gear shift lever 18. When this occurs, the normally open contacts of switch 16 open to break the current path for the coil of relay 12. By controlling the relay coil, it is possible to control the operation of the overdrive by applying pressure to the gear shift rod 68. The normally open contacts of switch 16 are held closed when the gear shift lever is in zone 96 defined by dashed lines in FIG. 5.

Gear shift rod 68 has a bracket 80 secured thereto in the manner shown in FIG. 3. To this end bracket 80 includes two halves 82 and 84 which surround rod 68 and are held thereto by screws 86. The switch arm 88 of switch 16 normally engages one face 90 of bracket 80 and is shifted into a dash line position 92 when the switch is to be closed, such as when gear shift lever is moved to the side 94 (FIG. 5) of the H-shaped shifting pattern thereof. While the foregoing has been described with respect to the gear shift lever adjacent to the steering wheel of column 20, the teachings of the invention can also be applied to the case where the gear shifting lever is on the floor of the vehicle.

The operation of control system 10 will be described with reference to a vehicle towing a large load and approaching a hill. In making the approach, the speed of the vehicle is held as close to 55 mph as possible and during the approach the transmission is in the high position of the overdrive or in high-over. When the speed falls, such as to 45 mph, gear shift lever 18 is tapped to move it toward side 74 and out of zone 96 (FIG. 5), causing a down shift to the high gear of the regular transmission or to high-direct. Should the speed of the vehicle continue to drop, such as to 40 mph, a smooth deliberate shift to second gear is made and this is done by using the synchromesh gears provided in the transmission. This is done with no double clutching or speed shifting so that this manner of shifting allows solenoid 32 to re-engage and the vehicle proceeds in second gear in overdrive or in second-over. If this gear does not hold a constant speed of the vehicle, the gear shift lever 18 is again tapped to move it toward side 74 to drop the transmission into second-direct. In the latter gear, the speed can be advanced such as up to 30 mph. Up-shifting is done in the reverse, low, second, second-over, high and high-over. Each gear has an advantage over the other.

In the operation of the switch 16, fingertip pressure is applied to gear shift lever 18. This causes a lifting up slightly on lever 18, causing switch 16 to open to thereby deenergize the coil of relay 12. When this occurs, contacts 22 and 24 of contact set 12a open the current path for winding 30 of solenoid 32. Also, contacts 44 and 66 of contact set 12b close to provide a ground path for the shorting of the distributor through the groundout switch 62 of solenoid 32. At the first loss of power, solenoid 32 is forced out of engagement by a large spring (not shown) forming a part of the solenoid. As soon as the solenoid drops out, the short is removed from the distributor and the operation continues in direct drive. This shift has taken place below a full power condition of the vehicle so that there is minimal shock, if any, to the vehicle.

In daily use, control system 10 can be used typically in freeway approach conditions. Normally the on-ramp onto a freeway involves a turn and a slight up-grade. The vehicle typically enters the on ramp travelling in high-over. As the vehicle slows down coming into the turn of the on ramp, the engine is below its good torque range. Thus, by tapping the gear shift lever 18, transmission immediately shifts to high-direct, giving great acceleration to negotiate the curved upgrade and attain freeway speed in a safe fashion. Once the freeway speed is reached, letting off on the foot feed, drops the overdrive back into operation.

Prior overdrive transmission controls provided certain disadvantages which the present invention overcomes. For instance, assuming a light vehicle rounding the same curve mentioned above with rain, sleet, snow or ice on the road, the original full power kick down to high-direct could result in a breakaway condition of the vehicle and could probably cause a serious accident. Since the overdrive transmission as used twenty years ago was never properly controlled, it was discarded as unacceptable by most drivers.

If the overdrive transmission is controlled in the way proposed and accordance with the teachings of this invention, it could provide improved operating performance and also provide a means to obtain significant fuel economy. Driving in city traffic where frequent slowing and accelerating is the normal driving pattern is made especially easy with the control sytem of this invention. The vehicle may be started from a stopped condition using second gear. Thus, the second-over is used instead of high, giving good engine breaking before and excellent acceleration when needed. Due to the low speed differential ratio, the governor holds the overdrive engaged until the speed is slow enough the reduce the need to overuse the service brakes.

When approaching a stop sign, the gear shift is tapped to insure the solenoid has dropped out, then the transmission is shifted to neutral without the use of the clutch. Used in this manner, much clutch pedal usage is eliminated and the driver is more inclined not to spend long periods of time with the clutch pedal depressed, wearing the clutch bearing and the crank shaft thrust bearing. Having started in second gear, the driver need only shift once to permit use of four gears.

Using a standard 2.5 liter production engine (US) the gasoline mileage can be increased from 21 mpg to over 30 mpg while at the same time providing improved operating performance and pleasure. Due to the lack of clutch pedal usage, it can now be applied as a semi-automatic transmission.

I claim:

1. A control system for use with an overdrive transmission of a motorized vehicle with the vehicle having a movable gear shift rod and an ignition coil and with said transmission having a governor switch and an actuating solenoid comprising: an electrical circuit part including a relay coil and a limit switch, said limit switch having an actuating arm, said circuit part adapted to be coupled to said governor switch and to a voltage source in series relationship therewith to form a circuit, said relay having first and second sets of electrical contacts, the first set of contacts being operable to couple the coil of the solenoid to a source of electrical current when said relay is energized, the second set of contacts being operable to couple the distributor side of the ignition coil to ground when the relay is deenergized, a bracket adapted to be mounted on the gear shift rod, said limit switch having means thereon for mounting the same adjacent to said gear shift rod at a location with the actuating arm of the limit switch normally engaging the bracket when the bracket is on the rod and when the switch is mounted adjacent to said gear shift rod to cause actuation of the limit switch in response to the movement of the gear shift rod relative to the limit switch.

2. A control system as set forth in claim 1, wherein said bracket includes a pair of halves, each half adapted to partially surround said gear shift rod, and screw means for coupling the halves together when they partially surround the rod, one of the halves having a surface for engaging said actuating arm of the limit switch.

3. A control system as set forth in claim 1, wherein each of said contact sets has an indicator lamp coupled thereto to indicate the operative condition thereof.

4. In a motorized vehicle of the type having an overdrive transmission with the vehicle having an ignition coil and a movable gear shift rod and the transmission having a solenoid and a governor switch, the combination with said ignition coil, the gear shift rod, the solenoid and the governor switch of: a control system including a relay having a coil and a pair of sets of electrical contacts, and a limit switch provided with an actuating arm, said relay coil, said limit switch and said governor switch defining a part of an electrical circuit adopted to be coupled to a source of voltage to permit current flow through the circuit, a first set of said contacts of the relay being coupled to the coil of the solenoid for coupling the coil to a source of current when the relay coil is energized, the second set of electrical contacts being coupled to the distributor side of the ignition coil to ground the same when said relay coil is deenergized, a bracket mounted on the gear shift rod, said limit switch having means thereon for mounting the same on the vehicle adjacent to said gear shift rod, said limit switch being in coupled relationship to said gear shift rod at a location with the actuating arm of the limit switch normally engaging the bracket when the limit switch is mounted adajcent to said gear shift rod to cause the limit switch to be actuated and deactuated as a function of the movement of said gear shift rod in opposed directions.

5. A control system as set forth in claim 4, wherein said bracket includes a pair of halves, each half partially surrounding said gear shift rod, and screw means for coupling the halves together, one of the halves having a surface engaging said actuating arm of the limit switch.

6. A control system as set forth in claim 4, wherein each of said contact sets has an indicator lamp coupled thereto to indicate the operative condition thereof.

* * * * *